US012421882B2

United States Patent
Szolak et al.

(10) Patent No.: US 12,421,882 B2
(45) Date of Patent: Sep. 23, 2025

(54) METHOD FOR INTRODUCING HEAT INTO AT LEAST ONE COMPONENT OF AN EXHAUST-GAS AFTERTREATMENT DEVICE, SOFTWARE AND OPEN-LOOP OR CLOSED-LOOP CONTROL DEVICE

(71) Applicant: FRAUNHOFER-GESELLSCHAFT ZUR FÖRDERUNG DER ANGEWANDTEN FORSCHUNG E.V., Munich (DE)

(72) Inventors: Robert Szolak, Freiburg (DE); Anand Bhurabhai Kakadiya, Freiburg (DE); Paul Beutel, Freiburg (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 18/313,674

(22) Filed: May 8, 2023

(65) Prior Publication Data
US 2023/0332527 A1 Oct. 19, 2023

Related U.S. Application Data

(63) Continuation of application No. PCT/EP2021/081092, filed on Nov. 9, 2021.

(30) Foreign Application Priority Data

Nov. 9, 2020 (DE) .............................. 102020129497

(51) Int. Cl.
*F01N 3/20* (2006.01)
*F01N 11/00* (2006.01)

(52) U.S. Cl.
CPC .......... *F01N 3/2013* (2013.01); *F01N 11/005* (2013.01); *F01N 11/007* (2013.01);
(Continued)

(58) Field of Classification Search
CPC .... F01N 3/0253; F01N 3/2006; F01N 3/2013; F01N 3/2026; F01N 3/2053; F01N 3/36;
(Continued)

(56) References Cited

U.S. PATENT DOCUMENTS 5,467,594 A * 11/1995 Aoki ..................... F01N 13/009
60/284
5,655,362 A * 8/1997 Kawajiri ............... F01N 3/0871
60/284

(Continued)

FOREIGN PATENT DOCUMENTS

| DE | 20 2009 005 251 U1 | 12/2009 |
| DE | 10 2018 104 275 A1 | 8/2019 |
| DE | 10 2019 203 306 A1 | 9/2020 |

OTHER PUBLICATIONS

Fraidl et al., Verbrennungsmotor 4.0, MTZ Motortech Z, 2018, 79:28-35, https://doi.org/10.1007/s35146-018-0066-y (no translation available).

(Continued)

*Primary Examiner* — Dapinder Singh
(74) *Attorney, Agent, or Firm* — Womble Bond Dickinson (US) LLP (57) ABSTRACT

A method for introducing heat into at least one component of an exhaust-gas aftertreatment device of an internal combustion engine (15). The method involves at least partially reacting a partial flow of an exhaust-gas flow with fuel in a heated catalyst (2) and then feeding back the resulting product to the exhaust-gas flow, The amount of fuel fed to the heated catalyst and/or the partial flow fed to the heated (Continued)

catalyst is controlled, by open-loop or closed-loop control, in accordance with the exhaust-gas temperature upstream and/or downstream of the component. The amount of fuel fed to the heated catalyst and/or the partial flow fed to the heated catalyst is determined by means of at least one heated-catalyst characteristic map. A computer readable medium stores a signal sequence representing data suitable for transmission by means of a computer network, to an open-loop or closed-loop control device to carry out the above-described method.

20 Claims, 4 Drawing Sheets

(52) U.S. Cl.
CPC .... *F01N 2560/025* (2013.01); *F01N 2560/06* (2013.01); *F01N 2560/14* (2013.01)

(58) Field of Classification Search
CPC ...... F01N 9/005; F01N 11/005; F01N 11/007; F01N 2240/14; F01N 2240/16; F01N 2410/00; F01N 2560/025; F01N 2560/06; F01N 2560/14; F01N 2900/08; F01N 2900/1402; F01N 2900/1404; F01N 2900/1411; Y02T 10/12; Y02T 10/40
See application file for complete search history.

(56) References Cited

U.S. PATENT DOCUMENTS

| | | | |
|---|---|---|---|
| 6,018,943 A * | 2/2000 | Martin | F01N 3/0878 60/287 |
| 8,468,805 B2 * | 6/2013 | Wakao | F01N 3/0842 60/287 |
| 2008/0173008 A1 * | 7/2008 | Kidokoro | F01N 11/002 60/276 |
| 2010/0037607 A1 | 2/2010 | Döring | |
| 2014/0000241 A1 | 1/2014 | Baier et al. | |
| 2021/0215076 A1 | 7/2021 | Ellmer | |
| 2022/0010712 A1 | 1/2022 | Szolak et al. | |

OTHER PUBLICATIONS

Gao et al., "Review of thermal management of catalytic converters to decrease engine emissions during cold start and warm up," Applied Thermal Engineering, 2019, 147:177-187, https://doi.org/10.1016/j.applthermaleng.2018.10.037.

Graf et al., "Optimales Thermomanagement und Elektrifizierung in 48-V-Hybriden," MTZ Motortech Z, 2018, 79:42-47, https://doi.org/10.1007/s35146-018-0079-6 (no translation available).

Kang et al., "Effect of Pt:Pd ratio on CO and hydrocarbon oxidation," Applied Catalysis B: Environmental, 2018, 223:67-75, https://doi.org/10.1016/j.apcatb.2017.05.057.

Mitterecker, "Dieselmotor als wichtiger Baustein zur CO2-Flottenzielerreichung," MTZ Motortech Z, 2018, 79:40-45, https://doi.org/10.1007/s35146-018-0042-6 (no translation available).

Szolak et al., "CatVap®—Experimental Investigation of a New Heating Measure for Exhaust Aftertreatment Systems," 2020 (10 pp).

International Search Report issued Mar. 9, 2022 in PCT/EP2021/081092 (English translation).

Written Opinion issued Mar. 9, 2022 in PCT/EP2021/081092 (no English translation).

* cited by examiner

METHOD FOR INTRODUCING HEAT INTO AT LEAST ONE COMPONENT OF AN EXHAUST-GAS AFTERTREATMENT DEVICE, SOFTWARE AND OPEN-LOOP OR CLOSED-LOOP CONTROL DEVICE

RELATED APPLICATIONS

This is a Bypass Continuation of International Application No. PCT/EP2021/081092 filed Nov. 9, 2021, and published as WO 2022/096072A1, which claims priority to DE 10 2020 129 497.2 filed Nov. 9, 2020.

FIELD OF THE INVENTION

The invention relates to a method for introducing heat into at least one component of an exhaust-gas aftertreatment device of an internal combustion engine, in which a partial flow of an exhaust-gas flow is at least partially reacted with fuel in a heated catalyst and fed back to the exhaust-gas flow. The invention also relates to an open-loop or closed-loop control device as well as a computer program for carrying out a method of this type.

BACKGROUND OF THE INVENTION

It is known from practice to arrange in the exhaust-gas line of an internal combustion engine at least one component which purifies the raw exhaust gas of the internal combustion engine. This purification often comprises a catalytic post-oxidation, the filtering of particles or the catalytic reaction of nitrogen oxides with a reducing agent. In some cases, a plurality of components for different method steps of the exhaust-gas aftertreatment or exhaust-gas purification can also be run through sequentially.

Insofar as this component renders possible a chemical reaction of the raw exhaust gas, the component usually requires a certain operating temperature of, for example, more than 200° C. or even more than 300° C. in order to purify the raw exhaust gas with sufficient efficiency. Although, particulate filters can be effective even at ambient temperature, they need to be regenerated at a certain loading, which is usually done by oxidation of the embedded particles at high temperatures and gaseous discharge of the combustion products.

There is thus a need to heat all or at least individual components of an exhaust-gas aftertreatment device by supplying thermal energy at least occasionally. This can be done, for example, by means of internal engine measures which, although they adversely affect the efficiency and/or pollutant emissions of the internal combustion engine, they raise, on the other hand, the exhaust-gas temperature of the raw exhaust gas so that additional heat is introduced into the components of the exhaust-gas aftertreatment device.

WO 2020/193595 A1 additionally discloses the use of a heated catalyst to which a partial flow of the raw exhaust gas emitted by the internal combustion engine is fed. This partial flow of raw exhaust gas is reacted with fuel. In this process, heat can be generated, on the one hand, by an exothermic reaction independently of the operation of the internal combustion engine and fed to the exhaust-gas aftertreatment device. In addition, this known heated catalyst allows the production of an easily ignitable synthesis gas from the supplied fuel. This synthesis gas can be exothermically reacted on an exhaust-gas catalyst, thus generating heat directly within the exhaust-gas catalyst.

However, this known device has the disadvantage that during a dynamic operation of an internal combustion engine, in particular in motor vehicles, the exhaust-gas mass flow and its composition vary. Since the amount of heat emitted from the heated catalyst into the component of the exhaust-gas aftertreatment device depends nonlinearly on the amount of exhaust gas supplied, the amount of fuel supplied, and the composition of the exhaust gas supplied, this leads to large fluctuations in the heat emitted from the heated catalyst. In addition, the temperature control of a component of an exhaust-gas aftertreatment device is complicated by long dead times.

Based on the prior art, there is thus a need to more reliably control, by open-loop or closed-loop control, the heat introduction into at least one component of an exhaust-gas aftertreatment device in order, on the one hand, to prevent cooling of the exhaust-gas aftertreatment device with subsequent emission slip and, on the other hand, not to use unnecessary energy for heating.

SUMMARY

According to the invention, this object is achieved by a method according to claim 1, a data carrier having data stored thereon or a signal sequence which represents data and is suitable for transmission by means of a computer network according to claim 12, and an open-loop or closed-loop control device according to claim 13. Advantageous further developments of the invention are found in the subclaims.

According to the invention, a method for introducing heat into at least one component of an exhaust-gas aftertreatment device of an internal combustion engine is proposed. In some embodiments of the invention, the internal combustion engine can be a spark-ignited internal combustion engine or a gasoline engine. In other embodiments of the invention, the internal combustion engine can be a compression-ignition internal combustion engine or a diesel engine. The internal combustion engine used according to the invention can be part of a motor vehicle, for example a passenger car or a truck. In other embodiments of the invention, the internal combustion engine can be used in a construction machine or a ship. In yet other embodiments of the invention, the internal combustion engine can also be used in stationary power generators or compressors. The advantages of the method according to the invention are particularly apparent in a dynamic operation, i.e. when the load requirements of the internal combustion engine change for a short time. This is the case, for example, with motor vehicles, especially in city traffic.

The component of an exhaust-gas aftertreatment device used according to the invention can, for example, be a three-way catalyst. In other embodiments of the invention, the component can be selected from an oxidation catalyst, a storage catalyst, an SCR system, and/or a particulate filter. In some embodiments of the invention, a plurality of such components can also be present in an exhaust-gas aftertreatment device and raw exhaust gas from the internal combustion engine can flow therethrough in parallel or sequentially.

According to the invention, it is proposed that a partial flow of the exhaust-gas flow of the internal combustion engine be at least partially reacted with fuel in a heated catalyst in order to feed the product generated in the heated catalyst back to the exhaust-gas flow. This results in the advantage that the device for generating heat is largely independent of the internal combustion engine, so that the internal combustion engine does not have to be operated with unfavorable operating conditions in order to generate additional heat. On the contrary, the internal combustion engine can always be operated in such a way that the mechanical power required in each case is produced with the lowest possible pollutants and/or the lowest possible fuel consumption.

The method according to the invention now aims to determine the exhaust-gas temperature in the direction of flow upstream and/or downstream of the component of the exhaust-gas aftertreatment device which is provided for introducing heat, and to control, in open-loop or closed-loop control, the amount of heat emitted by the heated catalyst on the basis of the temperature. In this context, the heat emitted by the heated catalyst can be influenced by the supplied fuel amount and/or the mass flow of the partial flow of the raw exhaust gas fed to the heated catalyst as a reference variable. According to the invention, it is thus proposed to adjust one or both influencing variables on the heat emitted by the heated catalyst per unit time on the basis of at least one exhaust-gas temperature so that the exhaust-gas temperature upstream and/or downstream of the component is kept constant at a predeterminable desired value or within predeterminable fluctuation ranges. In some embodiments of the invention, the heated catalyst can have further reference variables, for example an ambient air supply or an electrical heating device. They can be controlled in the same manner. In some embodiments of the invention, the fuel fed to the heated catalyst is here completely or at least partially liquid.

The thus controlled desired value of the exhaust-gas temperature in at least one predeterminable spot of the exhaust-gas aftertreatment device can vary during the operation of the internal combustion engine. For example, the desired value upstream of a particulate filter can be temporarily increased if a differential pressure sensor detects an inadmissibly high loading of the particulate filter and the particulate filter shall be regenerated by oxidation of the particles. The desired value of the exhaust-gas temperature can then be lowered again as a function of time or on the basis of measured values when the particulate filter has been regenerated. In other embodiments of the invention, the exhaust-gas temperature can be controlled in such a way that it does not fall below certain minimum values, for example when operating oxidation catalysts or SCR systems, which require a minimum temperature for operation. If this minimum temperature is not reached, for example due to partial load operation of the internal combustion engine, additional heat can be introduced by the heated catalyst used according to the invention.

In some embodiments of the invention, the exhaust-gas temperature upstream and/or downstream of the component of the exhaust-gas aftertreatment device can be detected by at least one temperature sensor. In a manner known per se, it is possible to use, as temperature sensors, thermocouples or resistance thermometers which generate an electrical signal corresponding to the temperature. Depending on the measured variable of the exhaust-gas temperature that is detected in this way, the reference variables on the heated catalyst can then be influenced in order to control, by open-loop or closed-loop control, the control variable of the thermal power of the heated catalyst.

In some embodiments of the invention, the exhaust-gas temperature upstream and/or downstream of the component of the exhaust-gas aftertreatment device can be determined from the operating state of the internal combustion engine. This feature allows additional sensor technology to be saved, thereby increasing the operational reliability. For example, the temperature developing at a catalyst or particulate filter can be calculated or tabulated from the thermal power converted in the internal combustion engine, the proportion of this power dissipated into the exhaust gas and the heat dissipation of the exhaust-gas line upstream of the component on the basis of the outside temperature and the inflow velocity of the airstream. This allows a heat balance to be established for the component and the ensuing temperatures to be derived without the use of a temperature sensor in the exhaust-gas flow.

In some embodiments of the invention, a portion of the exhaust-gas temperatures can be measured and another portion of the exhaust-gas temperatures can be calculated. For example, a measured temperature downstream of an oxidation catalyst and the operating state of the internal combustion engine can be used to calculate the temperature upstream of the oxidation catalyst, or vice versa. In other embodiments of the invention, the inlet temperature or also the outlet temperature of an SCR system located downstream of the oxidation catalyst can be determined from a temperature downstream of the oxidation catalyst.

In some embodiments of the invention, the operating state of the internal combustion engine, which is used to determine the exhaust-gas temperature can be determined from currently applied characteristic map values or characteristic map ranges of the engine control unit of the internal combustion engine. Thus, it is no longer necessary to measure, for example, the exhaust-gas mass flow of the raw exhaust gas of the internal combustion engine. Instead, the exhaust-gas mass flow can be determined with high accuracy from the intake air amount and the supplied fuel amount. In some cases, the operating state of the internal combustion engine can be determined with greater accuracy using other characteristic maps, for example the measured values of a $\lambda$-probe, the rotational speed, the accelerator pedal position, the position of the EGR valve, the cooling water temperature or further values which are not explicitly mentioned here.

Heated catalysts of the type used exhibit a nonlinear behavior of heat dissipation on the basis of the amount of fuel supplied and/or of the partial flow of raw exhaust gas fed to the heated catalyst. According to the invention, the amount of fuel supplied to the heated catalyst and/or the partial flow of the raw exhaust gas supplied to the heated catalyst is determined by means of at least one heated catalyst characteristic map. The input variables of the heated-catalyst characteristic map can, for example, be selected from the exhaust-gas mass flow of the internal combustion engine and/or the oxygen content of the raw exhaust gas and/or at least one exhaust-gas temperature and/or a driving profile and/or a navigation destination and/or position data and/or the state of charge of at least one battery. The open-loop or closed-loop control by means of a heated-catalyst characteristic map here has in particular the advantage that the control can also be carried out very quickly even if the operation is highly dynamic since only the desired values of the reference variables which are currently suitable for the operating conditions of the internal combustion engine have to be read out from the conversion table stored in the control device and set at the heated catalyst.

In some embodiments of the invention, the exhaust-gas mass flow of the internal combustion engine and/or the oxygen content of the raw exhaust gas of the internal combustion engine and/or at least one exhaust-gas temperature can be determined using a first reference-controlled synthesizer. For the purposes of the present invention, such a reference-controlled synthesizer designates a system which reconstructs non-measurable variables from known input variables and output variables of the internal combustion engine. For this purpose, the synthesizer reproduces the internal combustion engine as a model and uses a controller to reconstruct the measurable state variables, which are therefore comparable with the real internal combustion engine. In this way, it is, for example, possible to calculate an exhaust-gas mass flow of the raw exhaust gas of the internal combustion engine from the intake air mass and the supplied fuel amount, without having to measure the exhaust-gas mass flow with great technical effort and without generating a growing error over the operating time.

In some embodiments of the invention, the thermal power which is outputted by the heated catalyst can be determined from the amount of fuel supplied to the heated catalyst and/or the partial flow of the raw exhaust gas of the internal combustion engine which is supplied to the heated catalyst and/or the oxygen content of the raw exhaust gas by means of a second reference-controlled synthesizer. Therefore, an exact measured value of the thermal power or the amount of heat introduced into the exhaust-gas aftertreatment by the heated catalyst is always available for the temperature control without the need to measure this thermal power with great technical effort.

In some embodiments of the method, the heated catalyst can have at least a second operating state in which the air ratio $\lambda$ of the heated catalyst is between about 0.75 and about 30. In other embodiments of the method, the heated catalyst can have at least a second operating state in which the air ratio $\lambda$ of the heated catalyst is between about 1.0 and about 10. This first operating state can also be referred to as burner operation since the amount of fuel supplied is largely or completely reacted in the heated catalyst with the residual oxygen of the raw exhaust gas. In this first operating state, the heated catalyst emits a hot gas which can be supplied to the component of the exhaust-gas aftertreatment via an exhaust-gas line and heats the component by directly introducing heat.

In some embodiments of the invention, the heated catalyst can further have at least a fourth operating state in which the air ratio $\lambda$ of the heated catalyst is between about 0.05 and about 0.7. In this operating state, a portion of the fuel is exothermically reacted. The heat released by this can be used to vaporize another portion of the fuel supplied and discharge it in gaseous form into the exhaust-gas line. Alternatively or additionally, the fuel can be converted by chemical reactions on the heated catalyst into a synthesis gas, which is also discharged into the exhaust-gas line. The synthesis gas and/or fuel vapor can be oxidized at an exhaust-gas catalyst, for example, where it releases thermal energy directly in the component of the exhaust-gas aftertreatment device to be heated, such that it is heated with lower thermal losses and/or greater thermal power.

In some embodiments of the invention, the heated catalyst can include at least one electrical heating device that is used in a first operating state to bring the heated catalyst to an operating temperature at which supplied fuel can be at least partially reacted on the heated catalyst. This allows the heated catalyst to be brought to operating temperature after a cold start.

In some embodiments of the invention, the heated catalyst can contain at least one electrical heating device which, in an eighth operating state, is used to heat a partial flow of the raw exhaust gas of the internal combustion engine supplied to the heated catalyst. This embodiment makes it possible, when there is a surplus of available electrical energy, for example when the internal combustion engine is in an overrun mode and recuperating, to introduce heat into at least one component of the exhaust-gas aftertreatment device even without supplying fuel. In some of these embodiments, the electrical power supplied to the heated catalyst can be made dependent on the state of charge of at least one battery, i.e. the heated catalyst is not electrically heated until the electrical energy is not needed as a charging current or when position data and navigation destination allow battery charging at a later time in a predictive view of the trip. The battery can be selected from a starter battery and/or a high-voltage battery of a hybrid drive.

In some embodiments of the invention, the partial flow of the raw exhaust gas from the internal combustion engine that is supplied to the heated catalyst can be between about 3 kg/h and about 200 kg/h. In other embodiments of the invention, the partial flow of the raw exhaust gas from the internal combustion engine, which is supplied to the heated catalyst, can be between about 3 kg/h and about 100 kg/h. In yet other embodiments of the invention, the partial flow can be selected between about 6 kg/h and about 80 kg/h. In yet other embodiments of the invention, the partial flow can be selected between about 6 kg/h and about 150 kg/h. The partial flow can be selected on the basis of the oxygen content of the raw exhaust gas and/or on the basis of the desired operating state of the heated catalyst and/or on the basis of the required thermal heating power.

The method proposed according to the invention can be implemented in a computer program which carries out the method according to the invention when the computer program runs on a microprocessor. The computer program can be available on a data carrier having data stored thereon, or in the form of a data-representing signal sequence suitable for transmission by means of a computer network.

In some embodiments of the invention, the invention relates to an open-loop or closed-loop control device which is designed to carry out the method according to the invention. For this purpose, the open-loop or closed-loop control device can have at least one microprocessor or one microcontroller. In addition, the open-loop or closed-loop control device can contain memories which are designed to receive a computer program. In addition, the open-loop or closed-loop control device can contain analog or digital interfaces that can process sensor data, for example, the oxygen content of the raw exhaust gas and/or the exhaust-gas temperature upstream and/or downstream of the component of the exhaust-gas aftertreatment device. Finally, the open-loop or closed-loop control device can have a digital interface which is designed to receive data from an engine control unit of the internal combustion engine in order to derive the operating conditions of the heated catalyst from the current operating state of the internal combustion engine.

BRIEF DESCRIPTION OF THE DRAWINGS

The invention shall be explained in more detail below on the basis of drawings and exemplary embodiments without restricting the general concept of the invention. In the drawings.

DETAILED DESCRIPTION

Figure 1:
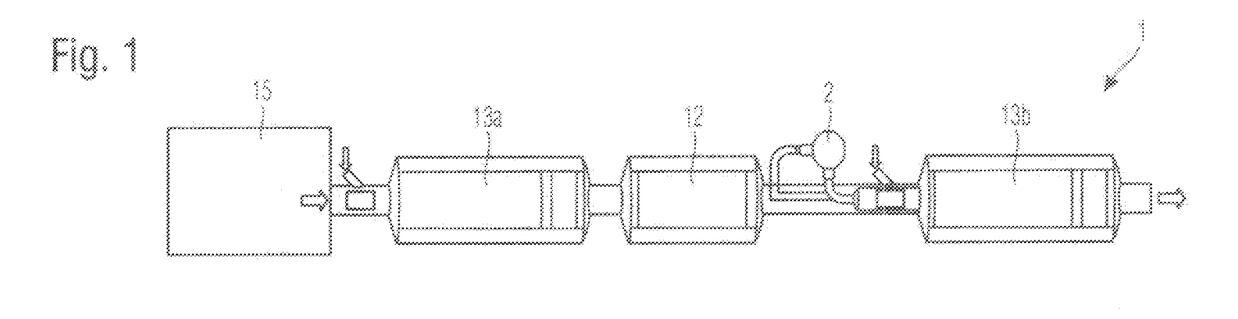
FIG. 1 shows a first exemplary embodiment of an exhaust-gas aftertreatment device that can be used according to the invention.

A first exemplary embodiment of an exhaust-gas aftertreatment device 1 usable according to the invention is explained in more detail on the basis of FIG. 1. The exhaust-gas aftertreatment device 1 is connected to an internal combustion engine 15 via an exhaust-gas line. The internal combustion engine 15 can be a compression-ignition internal combustion engine or also a spark-ignition internal combustion engine of known design. The internal combustion engine 15 draws in ambient air and exothermically reacts it with supplied fuel. In the process, the internal combustion engine 15 outputs mechanical power. During the operation of the internal combustion engine 15, a raw exhaust gas is produced which, in addition to $CO_2$ and $H_2O$, can also contain pollutants, such as $CH_x$, CO and/or $NO_x$.

The raw exhaust gas is fed to the exhaust-gas aftertreatment device 1 by means of an exhaust-gas line. Optionally, a sensor system can be installed in the exhaust-gas line, for example a λ-probe for measuring the oxygen content of the raw exhaust gas. In the illustrated first exemplary embodiment, the exhaust-gas aftertreatment device 1 includes a first SCR system 13a and a second SCR system 13b. The SCR systems are each designed to catalytically reduce nitrogen oxides in the raw exhaust gas by adding a reducing agent. For this purpose, temperatures above 220° C., preferably above 250° C., are required.

A particulate filter 12 is located in the flow direction between the two SCR systems 13a and 13b. The particulate filter 12 is designed to retain fine dust or soot particles produced during the operation of the internal combustion engine 15. If the particulate filter 12 becomes clogged with increasing use, it can be temporarily heated to high temperatures under oxygen supply so that the embedded particles are oxidized and discharged in gaseous form.

In the first exemplary embodiment shown in FIG. 1, the first SCR system 13a and the particulate filter 12 are installed close to the engine so that the thermal energy of the raw exhaust gas is sufficient to bring these components up to operating temperature or keep them at operating temperature. The second SCR system 13b, on the other hand, is located further downstream in the exhaust-gas line so that it reaches the operating temperature only slowly and/or can cool below its operating temperature during the part-load operation of the internal combustion engine 15. Therefore, exhaust-gas purification is inadequate in part-load operation, which is referred to as emission slip in the sense of the present description.

In order to solve this problem, a heated catalyst 2 is located upstream of the second SCR system 13b. A partial flow of the raw exhaust gas flowing in the exhaust-gas line is fed to the heated catalyst 2. Furthermore, a fuel is fed to the heated catalyst, which is reacted with the exhaust gas or the residual oxygen contained in the exhaust gas. The heat generated in this process is fed back to the exhaust-gas line in the form of a hot gas and introduced into the second SCR system 13b. This additional heat introduction can take place both after a cold start and during a part-load operation, thus allowing rapid heating, on the one hand, and preventing cooling during operation, on the other hand. At full load or near full load operating conditions of the internal combustion engine, the heated catalyst 2 can be switched off.

Figure 2:
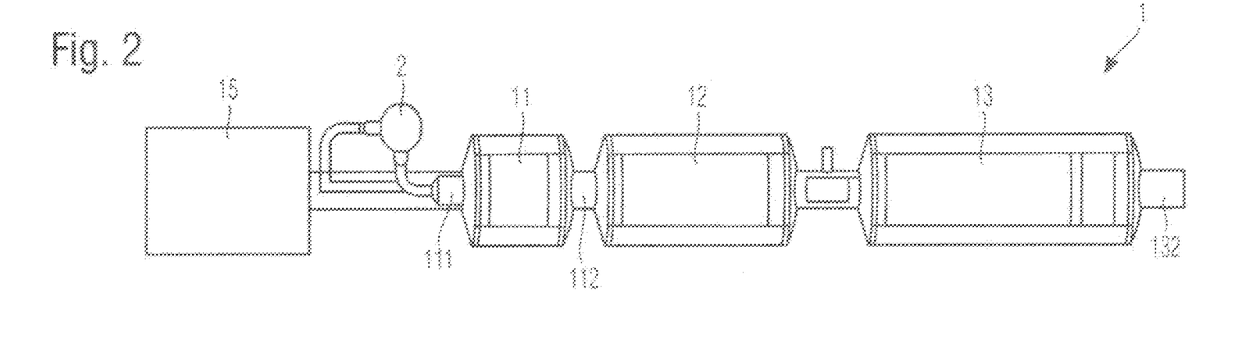
FIG. 2 shows a second exemplary embodiment of an exhaust-gas aftertreatment device that can be used according to the invention.

With reference to FIG. 2, a second exemplary embodiment of an exhaust-gas aftertreatment device which can be used according to the invention is explained in more detail. Equal reference signs denote equal components of the invention, so that the following description is limited to the essential differences. FIG. 2 shows an oxidation catalyst 11 which is designed to post-oxidize oxidizable components of the raw exhaust gas, for example CO and/or $CH_x$. A particulate filter 12 is disposed downstream of the oxidation catalyst, as described above. An SCR system, which is used in particular to reduce $NO_x$, is disposed downstream of the particulate filter 12.

In the illustrated exemplary embodiment, the heated catalyst 2 is located upstream of the oxidation catalyst 11 and downstream of the internal combustion engine 15. During operation, a partial stream of the not previously purified raw exhaust gas from the internal combustion engine 15 is therefore supplied to the heated catalyst 2.

FIG. 2 further shows three temperature sensors 111, 112 and 132. The temperature sensors measure the exhaust-gas temperature at the inlet to the oxidation catalyst, at the outlet from the oxidation catalyst and at the outlet from the SCR system. These three temperature sensors should be understood as merely exemplary. In other embodiments of the invention, the number of temperature sensors used can be greater or less. In some cases, no temperature sensor at all can be used, as described above with reference to FIG. 1. In this case, the temperatures can be determined from the operating state of the internal combustion engine, for example with a reference-controlled synthesizer.

It should be noted that the exhaust-gas aftertreatment devices 1 shown in FIGS. 1 and 2 should be understood as merely exemplary. In other embodiments of the invention, other components can be used, for example three-way catalysts or storage catalysts. Likewise, individual components can be omitted. It is merely essential to the invention that at least one component 11, 12, 13 is present in the exhaust-gas aftertreatment device 1.

The object of the invention is to achieve the operating temperature of at least one component 11, 12, 13 rapidly and/or to maintain it at low exhaust-gas temperatures of the internal combustion engine 15, which can occur in particular in the lower partial load range. An exhaust-gas temperature upstream and/or downstream of the component can either be measured, as shown in FIG. 2, or determined from the operating state of the internal combustion engine. In this second case, too, the temperature is referred to as a "measured value" for the purposes of the present description, even if it has not been measured directly, for example by a thermocouple or a resistance thermometer. Thus, the exhaust-gas temperatures may be indirectly determined from the operating state of the internal combustion engine, without direct measurement by temperature sensors.

The measured value of the temperature, its deviation from a predeterminable desired value, the heat capacity of the exhaust-gas line and upstream components of the exhaust-gas aftertreatment device, and the heat loss or gain of the raw exhaust gas on its way through the exhaust-gas aftertreatment device lead to a required thermal power of the heated catalyst 2 as control variable. This control variable can be influenced by the amount of fuel supplied to the heated catalyst 2 as well as the amount of exhaust gas supplied to the heated catalyst and, in some cases, the electrical energy supplied to the heated catalyst as reference variables. The reference variables in turn depend on the oxygen content of the raw exhaust gas, the exhaust-gas temperature and the exhaust-gas mass flow of the raw exhaust gas of the internal combustion engine 15. The exemplary embodiment of an open-loop or closed-loop control device 3 shown in FIG. 3 therefore uses a heated catalyst characteristic map 35. The heated catalyst characteristic map 35 is supplied with the temperatures and the oxygen content of the raw exhaust gas measured or determined via a first reference-controlled synthesizer from the data of the engine control unit 16. Likewise, measured values optionally read out from the engine control unit 16 are fed to the open-loop or closed-loop control device 3 by means of a digital data link 351. Thereafter, the open-loop or closed-loop control device 3 can read and set the reference variables with the aid of the heated catalyst characteristic map 35.

Figure 3:
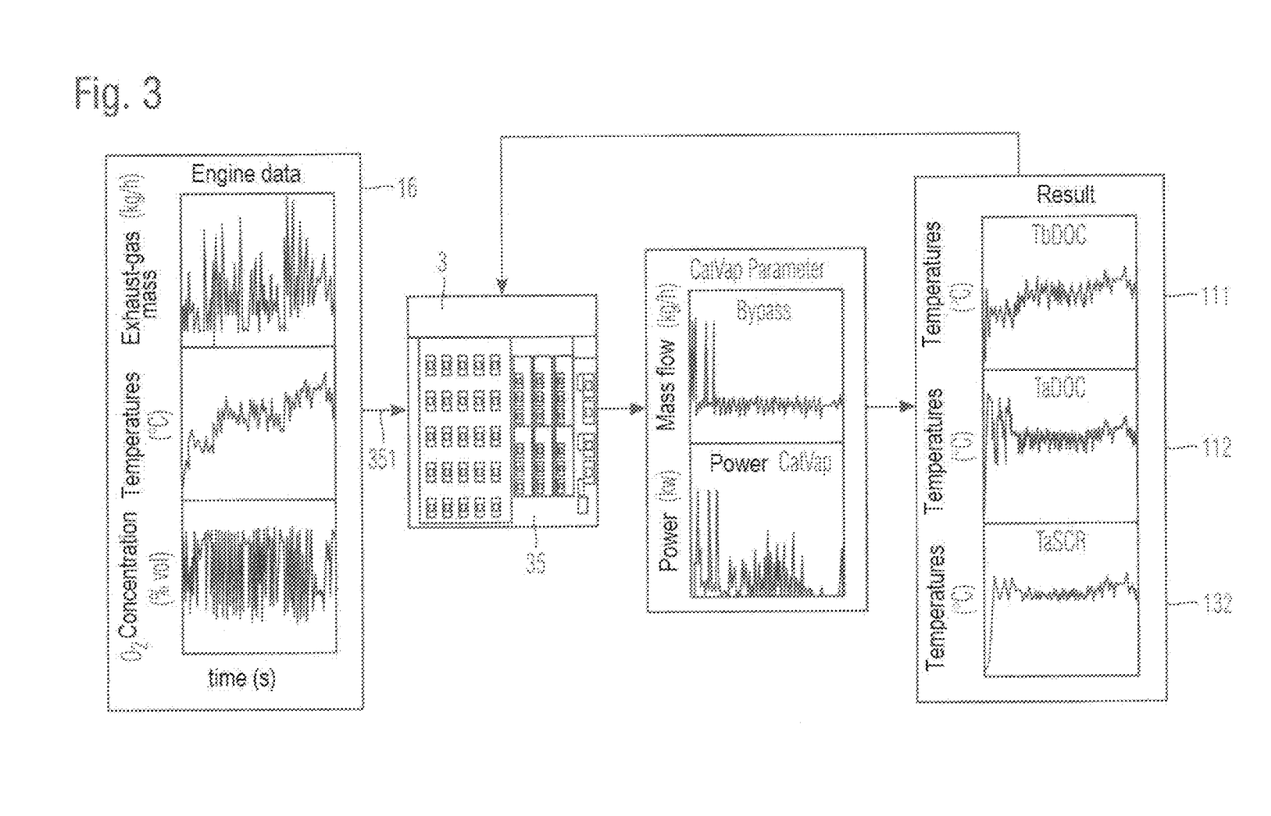
FIG. 3 shows a block diagram of an open-loop or closed-loop control device according to the present invention.

In some embodiments of the invention, further data can, in addition to the data from the motor control unit 16, be made available to the open-loop or closed-loop control device 3, which can then control the reference variables of the heated catalyst 2 more quickly or with greater accuracy, either under characteristic map control or also by calculation. This further data can be selected from a driving profile and/or a navigation destination and/or position data and/or the state of charge of a battery. For example, the heating power of the heated catalyst 2 can already be proactively reduced if it is known that the vehicle is about to drive up an incline and that a larger and also hotter exhaust-gas mass flow of the raw exhaust gas from the internal combustion engine is available as a result. Likewise, the heated catalyst can already be proactively activated at the end of an incline in order to prevent or reduce a drop in temperature of the component of the exhaust-gas aftertreatment device, which results from the fact that the internal combustion engine only operates at partial load or even in overrun mode when driving downhill. In the same way, position data can be used to define a base load range of the heated catalyst 2 since, for example in urban areas, a lower average load of the internal combustion engine 15 can be expected than during highway travel. Similarly, the operation of the vehicle in urban areas can indicate a higher dynamic range, whereas a more uniform load demand is placed on the internal combustion engine 15 during interurban travel. Finally, a navigation destination can also be used to control the heated catalyst 2, for example by stopping the regeneration of a particulate filter 12 shortly before reaching the driving destination or by postponing it until the vehicle reaches the city limit.

Figure 4:
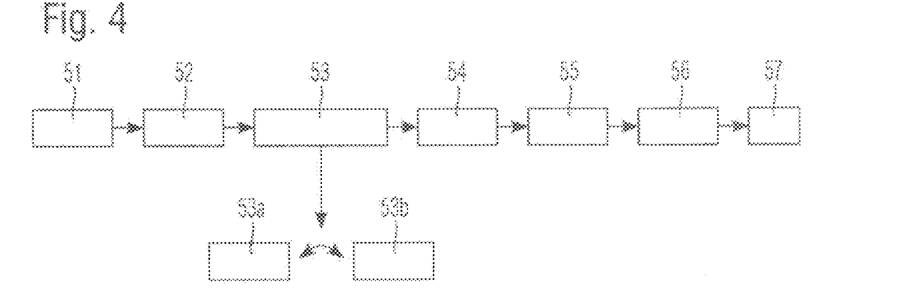
FIG. 4 shows a structure chart of the method according to the invention in a first embodiment.

FIG. 4 shows a structure chart of a first embodiment of the method according to the invention. In the first embodiment, the heated catalyst 2 can be operated in seven different operating states, which are designated by the reference signs 51 to 57. The process control according to FIG. 4 should not be understood as meaning that the seven operating states are necessarily run through sequentially. On the contrary, at least one temperature is determined downstream of an oxidation catalyst, either directly by measurement or indirectly from the operating state of the internal combustion engine. Depending on the temperature and optionally further parameters, for example the operating time of the internal combustion engine, one of the illustrated operating states of the heated catalyst 2 is then selected. If the temperature at the outlet of the oxidation catalyst changes so that the applied operating state is no longer appropriate, the open-loop or closed-loop control device changes to another operating state on the basis of the temperature. In this case, a hysteresis can be used to avoid frequent changes in the operating state of the heated catalyst 2. The individual operating states are explained in more detail below.

The first operating state 51 denotes the start of the heated catalyst. For this purpose, the heated catalyst can first be preheated by supplying an exhaust-gas mass flow with an optional electric heating device until supplied fuel is converted exothermically on the heated catalyst and heats the heated catalyst further to its operating temperature.

In the second operating state 52, a comparatively large exhaust-gas mass flow of, for example, about 60 kg/h to about 100 kg/h is supplied to the heated catalyst. The heated catalyst is operated with an air ratio $\lambda$ between about 0.75 and about 3.5 or between about 1.5 and about 2.5. This results in an almost complete conversion of the supplied fuel with the residual oxygen of the exhaust gas supplied to the heated catalyst 2. In some embodiments, the heated catalyst can deliver a thermal power of about 5 kW to about 20 kW in the form of a hot gas.

The third operating state 53 denotes an alternating operation in which cyclic switching occurs between a first sub-step 53a and a second sub-step 53b. In the first sub-step 53a, the operating conditions correspond approximately to the operation in the second method step 52. In the second sub-step 53b, the exhaust-gas mass flow is reduced by a factor of 10 to 25, for example to about 3 kg/h to about 10 kg/h, so that the heated catalyst is operated with an air ratio $\lambda$ of between about 0.05 and about 0.5 or between about 0.1 and about 0.4. In the second sub-step 53b, the supplied fuel is thus not completely reacted, but is partially vaporized and partially converted into a synthesis gas, which is supplied to the oxidation catalyst via the exhaust-gas line. The heat supplied in the first substep 53a allows the synthesis gas to ignite at the oxidation catalyst where it can be converted exothermically so that a heating power of about 13 kW to about 20 kW is released directly at the oxidation catalyst.

The fourth method step 54 is similar to the second sub-step 53b of the third method step 53. However, the partial exhaust-gas flow supplied to the heated catalyst is greater and can be between about 5 kg/h and about 20 kg/h. The control can be such that a predeterminable proportion of the raw exhaust gas is passed through the heated catalyst. For example, between about 2% and about 10% or between about 3% and about 8% of the exhaust-gas flow of the internal combustion engine can be fed as a partial flow to the heated catalyst 2. In the fourth operating state 54, the heated catalyst can supply a thermal power of from about 10 kW to about 50 kW or from about 14 kW to about 36 kW in the form of an ignitable synthesis gas to the oxidation catalyst 11. Therefore, the fourth operating state 54 is particularly suitable for the rapid heating of the exhaust-gas aftertreatment device after a cold start and after the heated catalyst is started in the first method step 51 and some preconditioning of the exhaust-gas aftertreatment device has taken place in the second and third process steps 52 and 53.

After the exhaust-gas aftertreatment device is heated to a predeterminable desired temperature, the heated catalyst 2a can be cleaned in the fifth method step 55. For this purpose, the supplied partial flow is increased again, for example to about 50 kg/h to about 100 kg/h. The amount of fuel supplied can be reduced compared with the second method step 52, so that the heat released in the heated catalyst 2 is primarily used to oxidize and vaporize remaining deposits and residual fuel in order to prevent permanent deposits and contamination in the heated catalyst 2.

The sixth method step 56 is suitable for a warm-keeping operation, for example if the internal combustion engine 15 only produces low exhaust-gas temperatures in the low partial load range or if no fuel at all is supplied to the internal combustion engine in overrun operation. In the sixth method step 56, the thermal power of the heated catalyst can be between about 0 kW and about 10 kW. For this purpose, a comparatively small partial flow of about 5 kg/h to about 50 kg/h of the raw exhaust gas is supplied to the heated catalyst 2, while the heated catalyst is operated with an air ratio λ of between about 0.75 and about 3.5 or between about 1.5 and about 2.5.

If the heated catalyst 2 is permanently not required at high exhaust-gas temperatures, it can also be switched off in the seventh method step 57. In this case, no fuel is fed to the heated catalyst 2 so that the heated catalyst does not emit any heat even in the event that a partial flow of the exhaust gas permanently flows through the heated catalyst due to its installation situation.

In some embodiments of the invention, the method steps 51, 52, 53 and 54 are run through cyclically after a cold start, in each case switching to the next operating state when predeterminable temperature thresholds are reached. During continuous operation of the internal combustion engine, it is then possible to switch between the operating states 54, 55, 56 and 57 on the basis of the exhaust-gas temperature or the deviation of the desired temperature value of the oxidation catalyst from the actual value. The temperature limit values between the individual operating states can be provided with a hysteresis in order to avoid frequent undesired changes of the operating state.

Figure 5:
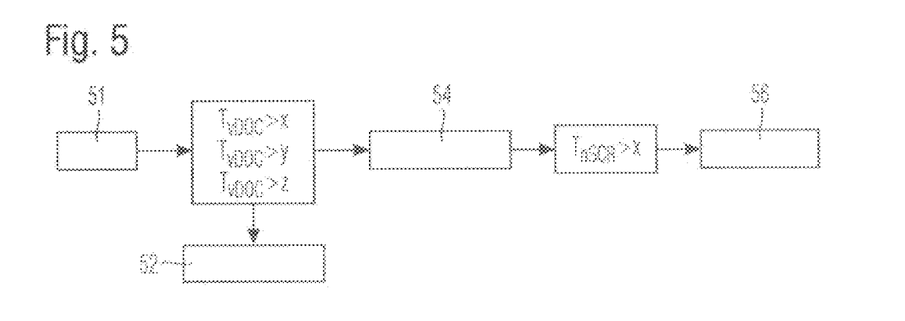
FIG. 5 shows a structure chart of the method according to the invention in a second embodiment.

With reference to FIG. 5, a structure chart of a second embodiment of the method according to the invention is explained in more detail. Equal components of the invention or equal operating states are provided with equal reference signs so that the following description is limited to the essential differences. After a cold start of the internal combustion engine or of the vehicle equipped therewith, the heated catalyst is started in the first method step 51.

As soon as the heated catalyst 2 has reached its operational readiness, the open-loop or closed-loop control device checks whether the exhaust-gas temperatures upstream and downstream of the oxidation catalyst 11 are above predeterminable limit values and whether the exhaust-gas mass flow of the raw exhaust gas exceeds a predeterminable minimum value. If this is the case, the fourth operating state with comparatively low partial flow and low air ratio can be started immediately, which allows rapid heating of the oxidation catalyst. If this is not the case, the component of the exhaust gas aftertreatment device is first preheated in catalytic burner mode according to the second operating state 52.

As soon as the heat front generated in the fourth method step 54 has penetrated all components of the exhaust-gas aftertreatment device and the temperature sensor 132 at the output of the SCR system also detects a value above a predeterminable limit value, the heated catalyst 2 is switched to warm-keeping operation according to the above described sixth operating state 56.

The process control according to FIG. 5 differs from the preceding control primarily in that the open-loop or closed-loop control device 3 of the heated catalyst 2 reads the operating data from the engine control unit 16 of the internal combustion engine 15 and, if necessary, uses further data, such as the remaining driving distance, the topography and the road class, to determine the required thermal power of the heated catalyst 2 in advance and, on the basis of the current and/or future operating conditions of the internal combustion engine, sets the respective optimum values for the partial flow and the fuel amount of the heated catalyst 2 using the heated-catalyst characteristic map 35. In this way, dead times of the control circuit can be eliminated so that the desired values of the temperature of the component of the exhaust-gas aftertreatment can be reached more quickly or the actual temperature fluctuates to a lesser extent.

Figure 6A:
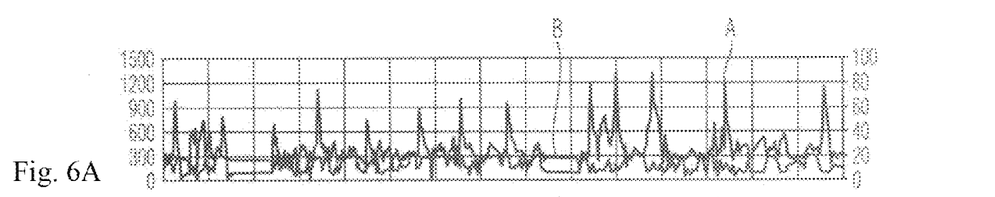
FIGS. 6A, 6B and 6C show the use of the method according to the invention in a first exemplary embodiment.
Figure 6B:
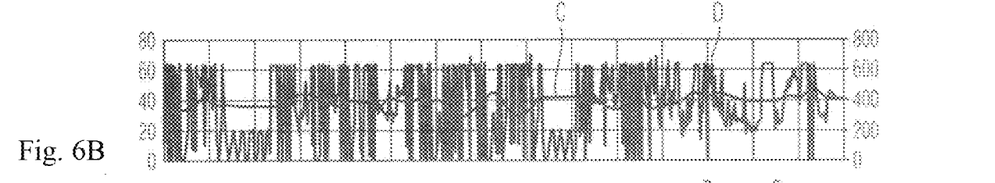
Figure 6C:
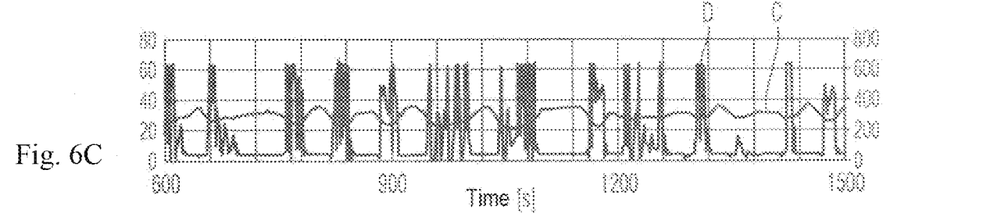

FIGS. 6A, 6B and 6C shows the use of the method according to the invention in a first exemplary embodiment of a multistage control system according to FIG. 4. FIG. 6A shows the exhaust-gas mass flow of a raw exhaust gas in curve A on the left ordinate and the oxygen content of the exhaust gas in curve B on the right ordinate versus time in seconds. FIG. 6B shows on the same time axis the temperature of the temperature sensor 112 downstream of the oxidation catalyst 11 on the right ordinate in curve C and the output power of the heated catalyst in curve D on the left ordinate. FIG. 6B shows measured values for a desired value of 400° C. FIG. 6C shows similar measured values as FIG. 6B, but for a desired value of 280° C.

As can be seen from FIGS. 6A-6C, the output power of the internal combustion engine 15 in the section shown from a WHTC cycle is not constant over time, but rather highly dynamic. Accordingly, the exhaust-gas mass flow and the oxygen content of the exhaust gas also change within a few seconds. As FIGS. 6B and 6C both show, the heated catalyst 2 can be controlled very rapidly with the open-loop or closed-loop control device according to the invention, so that the heat introduced by the heated catalyst largely compensates for the fluctuating heat introduced by the internal combustion engine, so that the output temperature downstream of the oxidation catalyst 11 only fluctuates to a small extent. The oxidation catalyst 11 can therefore always be used even in the part-load operation of the internal combustion engine. Emission slip does not occur.

Figure 7A:
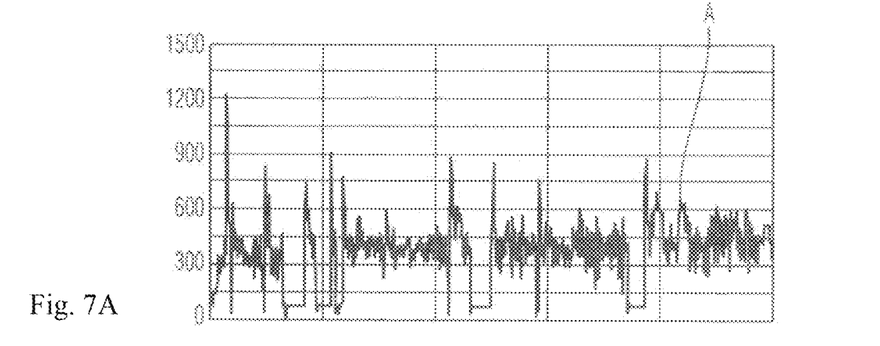
FIGS. 7A, 7B and 7C show the use of the method according to the invention in a second exemplary embodiment.
Figure 7B:
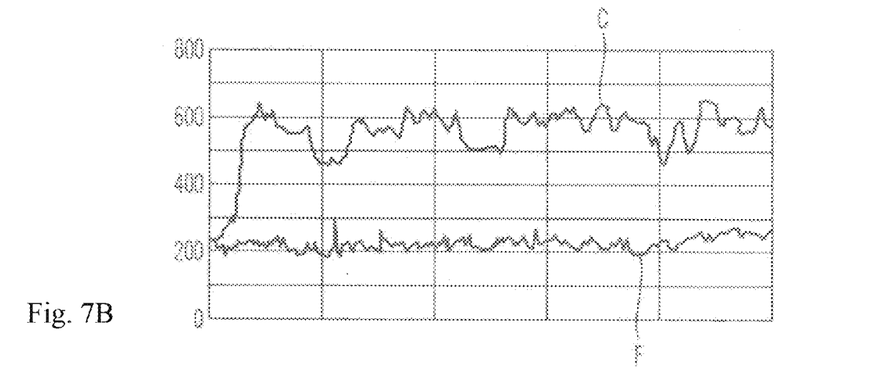
Figure 7C:
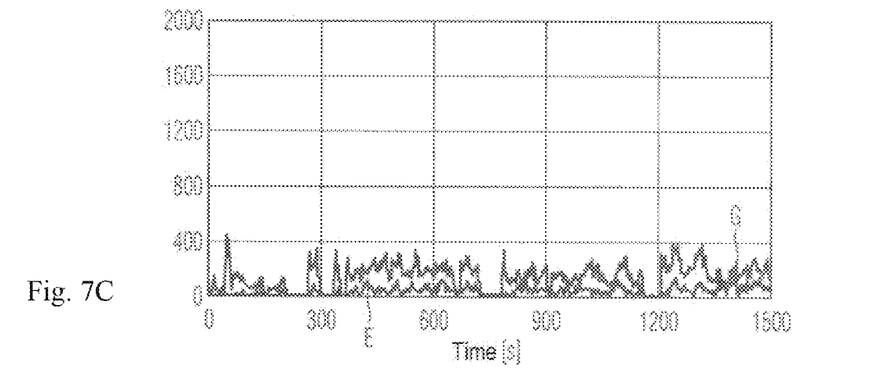

FIGS. 7A, 7B and 7C describe the use of the method according to the invention in a second exemplary embodiment, namely the regeneration of a particulate filter 12. FIG. 7A shows the exhaust-gas mass flow in curve A.

FIG. 7B shows in curve F the exhaust-gas temperature of the raw exhaust gas downstream of the internal combustion engine. Curve C shows the temperature at the outlet of the oxidation catalyst or at the inlet of the particulate filter. FIG. 7C shows in curve E the CO content of the raw exhaust gas and in curve G the $CH_x$ content.

For the regeneration of the particulate filter 12, high exhaust-gas temperatures are required to oxidize the embedded particles and discharge them in gaseous form from the particulate filter 12. According to the prior art, the exhaust-gas temperature is raised, for this purpose, by internal engine measures, which leads to poor consumption and emission values during the regeneration.

As FIGS. 7A-7C show, switching on the heated catalyst 2 after about 60 seconds leads to a rapid increase in the exhaust-gas temperature from about 200° C. to about 600° C. The exhaust-gas temperature is kept constant by the heated catalyst within a narrow temperature range despite a dynamic load demand on the internal combustion engine and correspondingly fluctuating exhaust-gas mass flow of the raw exhaust gas over time. As curves E, F and G show, no further in-engine measures are required for regeneration, i.e. the temperature of the raw-exhaust gas remains below 250° C. at all times. Similarly, the pollutant emissions shown in curves E and G are not increased during the regeneration of the particulate filter, which is different from the prior art.

Of course, the invention is not limited to the illustrated embodiments. Therefore, the above description should not be considered limiting but explanatory. The below claims should be understood as meaning that a stated feature is present in at least one embodiment of the invention. This does not rule out the presence of further features. Where the claims and the above description define "first" and "second" embodiments, this designation is used to distinguish between two similar embodiments without determining a ranking order.

What is claimed is:

1. A method for introducing heat into an exhaust-gas aftertreatment device (1) connected to an internal combustion engine (15) which outputs an exhaust-gas flow, the exhaust-gas aftertreatment device (1) comprising one or more of an oxidation catalyst component (11), a particulate filter component (12), and an SCR system component (13), the method comprising:
at least partially reacting a partial flow of the exhaust-gas flow with fuel in a heated catalyst (2) and feeding the reacted partial flow back into the exhaust-gas flow;
controlling the amount of fuel fed to the heated catalyst (2) and/or the partial flow of exhaust-gas flow fed to the heated catalyst (2) based on an exhaust-gas temperature upstream and/or downstream of said one or more components (11, 12, 13) in accordance with at least one heated-catalyst characteristic map (35); and
selecting input variables (351) of the heated-catalyst characteristic map (35) from one or more of:
(i) a driving profile;
(ii) a navigation destination;
(iii) position data; or
(iv) state of charge of at least one battery,
wherein:
the exhaust-gas temperature upstream and/or downstream of said one or more components (11, 12, 13) is indirectly determined from an operating state of the internal combustion engine (15), without direct measurement by temperature sensors.

2. A non-transitory computer-readable medium having data stored thereon or signal sequence which represents data and is suitable for transmission by means of a computer network, wherein the data represents a computer program which carries out the method according to claim 1, when the computer program is executed on a microprocessor.

3. An open-loop or closed-loop control device (3), configured to carry out the method according to claim 1.

4. The method according to claim 1, wherein the operating state of the internal combustion engine is determined from currently applied characteristic map values or characteristic map ranges of an engine control unit (16).

5. The method according to claim 4,
wherein selecting input variables (351) of the heated-catalyst characteristic map (35) further includes exhaust-gas mass flow of the internal combustion engine and at least one exhaust-gas temperature.

6. The method according to claim 1, characterized in that the exhaust-gas mass flow of the internal combustion engine (2) and/or the oxygen content of the raw exhaust gas of the internal combustion engine and/or at least one exhaust-gas temperature are determined by means of a first reference-controlled synthesizer.

7. The method according to claim 6, wherein:
the partial flow is between 6 kg/h and about 80 kg/h; and
the heated catalyst (2) has a plurality of operating states, including at least:
(i) a second operating state (52) in which an air ratio (k) of the heated catalyst (2) is between 1.0 and about 10; and
(ii) a fourth operating state (54) in which the air ratio (k) of the heated catalyst (2) is between about 0.05 and about 0.7.

8. The method according to claim 7, wherein the heated catalyst (2) contains at least one electrical heating device which:
in a first operating state, brings the heated catalyst (2) to an operating temperature at which supplied fuel can be at least partially reacted on the heated catalyst (2); and/or
in an eighth operating state, heats the partial flow fed to the heated catalyst (2).

9. The method according to claim 8, comprising:
determining an amount of thermal power outputted by the heated catalyst (2) from the fuel amount fed to the heated catalyst (2) and/or the partial flow fed to the heated catalyst (2) by means of a second reference-controlled synthesizer.

10. The method according to claim 1, comprising:
supplying said exhaust-gas temperature upstream and/or downstream of said one or more components (11, 12, 13) to the at least one heated-catalyst characteristic map (35); and
in response to said supplying, setting reference variables for the exhaust-gas aftertreatment device (1) based on one or more outputs of the heated catalyst characteristic map (35).

11. The method according to claim 1, comprising:
supplying temperatures and/or oxygen content of the exhaust gas flow to the at least one heated-catalyst characteristic map (35); and
in response to said supplying, setting reference variables for the exhaust-gas aftertreatment device (1) based on one or more outputs of the heated catalyst characteristic map (35).

12. A method for introducing heat into an exhaust-gas aftertreatment device (1) connected to an internal combustion engine (15) which outputs an exhaust-gas flow, the exhaust-gas aftertreatment device (1) comprising one or more of an oxidation catalyst component (11), a particulate filter component (12), and an SCR system component (13), the method comprising:
at least partially reacting a partial flow of the exhaust-gas flow with fuel in a heated catalyst (2) and feeding the reacted partial flow back into the exhaust-gas flow;
controlling the amount of fuel fed to the heated catalyst (2) and/or the partial flow of exhaust-gas flow fed to the heated catalyst (2) based on an exhaust-gas temperature upstream and/or downstream of said one or more components (11, 12, 13) in accordance with at least one heated-catalyst characteristic map (35); and
selecting input variables (351) of the heated-catalyst characteristic map (35) from two or more of:
(i) oxygen content of raw exhaust gas of the internal combustion engine; either remove this one or change to two or more;
(ii) a driving profile;
(iii) a navigation destination;
(iv) position data; or
(v) state of charge of at least one battery,
wherein:
the exhaust-gas temperature upstream and/or downstream of said one or more components (11, 12, 13) is indirectly determined from an operating state of the internal combustion engine (15), without direct measurement by temperature sensors.

13. The method according to claim 12, wherein the operating state of the internal combustion engine is determined from currently applied characteristic map values or characteristic map ranges of an engine control unit (16).

14. The method according to claim 12, wherein selecting input variables (351) of the heated-catalyst characteristic map (35) further includes exhaust-gas mass flow of the internal combustion engine and at least one exhaust-gas temperature, wherein the exhaust-gas mass flow of the internal combustion engine (2) and/or the oxygen content of the raw exhaust gas of the internal combustion engine and/or at least one exhaust-gas temperature are determined by means of a first reference-controlled synthesizer.

15. The method according to claim 14, wherein:
the partial flow is between 6 kg/h and about 80 kg/h; and
the heated catalyst (2) has a plurality of operating states, including at least:
(i) a second operating state (52) in which an air ratio (k) of the heated catalyst (2) is between 1.0 and about 10; and
(ii) a fourth operating state (54) in which the air ratio (k) of the heated catalyst (2) is between about 0.05 and about 0.7.

16. The method according to claim 15, wherein the heated catalyst (2) contains at least one electrical heating device which:
in a first operating state, brings the heated catalyst (2) to an operating temperature at which supplied fuel can be at least partially reacted on the heated catalyst (2); and/or
in an eighth operating state, heats the partial flow fed to the heated catalyst (2).

17. The method according to claim 16, comprising:
determining an amount of thermal power outputted by the heated catalyst (2) from the fuel amount fed to the heated catalyst (2) and/or the partial flow fed to the heated catalyst (2) by means of a second reference-controlled synthesizer.

18. The method according to claim 12, comprising:
supplying said exhaust-gas temperature upstream and/or downstream of said one or more components (11, 12, 13) to the at least one heated-catalyst characteristic map (35); and
in response to said supplying, setting reference variables for the exhaust-gas aftertreatment device (1) based on one or more outputs of the heated catalyst characteristic map (35).

19. The method according to claim 12, comprising:
supplying temperatures and/or oxygen content of the exhaust gas flow to the at least one heated-catalyst characteristic map (35); and
in response to said supplying, setting reference variables for the exhaust-gas aftertreatment device (1) based on one or more outputs of the heated catalyst characteristic map (35).

20. An open-loop or closed-loop control device (3), configured to carry out the method according to claim 12.

* * * * *